United States Patent [19]
Tsai

[11] Patent Number: 5,238,388
[45] Date of Patent: Aug. 24, 1993

[54] OPHTHALMIC LENS MOLD SEAL

[75] Inventor: James T. Tsai, Jacksonville, Fla.

[73] Assignee: Johnson & Johnson Vision Products, Inc., Jacksonville, Fla.

[21] Appl. No.: 802,808

[22] Filed: Dec. 6, 1991

[51] Int. Cl.⁵ .......................................... B29D 11/00
[52] U.S. Cl. ................................ 425/412; 249/117; 249/160; 264/1.1; 264/313; 425/808
[58] Field of Search ............. 249/52, 117, 154, 160, 249/82; 264/1.1, 2.2, 161, 163, 2.3, 2.19, 220, 225, 313; 425/292, 298, 318, 412, 423, 808, 175, 410, DIG. 44

[56] References Cited

U.S. PATENT DOCUMENTS

| | | | |
|---|---|---|---|
| 4,121,896 | 10/1978 | Shepherd | 425/808 |
| 4,208,365 | 6/1980 | LeFevre | 425/808 |
| 4,209,289 | 6/1980 | Newcomb et al. | 264/2.2 |
| 4,284,399 | 8/1981 | Newcomb et al. | 425/808 |
| 4,407,766 | 10/1983 | Haardt et al. | 425/808 |
| 4,495,313 | 1/1985 | Larsen | 523/106 |
| 4,565,348 | 1/1986 | Larsen | 249/122 |
| 4,640,489 | 2/1987 | Larsen | 249/122 |
| 4,889,664 | 12/1989 | Larsen et al. | 264/2.6 |
| 4,955,580 | 9/1990 | Seden et al. | 425/808 |
| 5,087,015 | 2/1992 | Galley | 425/808 |

FOREIGN PATENT DOCUMENTS

| | | |
|---|---|---|
| 0447361 | 9/1991 | European Pat. Off. |
| 2187999 | 9/1987 | United Kingdom 425/808 |
| 2235408 | 3/1991 | United Kingdom |

Primary Examiner—Scott Bushey

[57] ABSTRACT

An apparatus for molding a soft ophthalmic lens, having a male and female portion, one having around the periphery of the optical surface a knife edge and one containing a rim bushing peripherally exterior to the knife edge. The two portions are mated so that the knife edge deformably penetrates the other portion. Excess material is expelled from the mold cavity and separated from the lens by a region of prepolymer discontinuity defined by the rim bushing contact area. The mold portion containing the rim bushing is produced by using a cylindrical insert and an annular sleeve machined to have the rim bushing on the surface of one end.

4 Claims, 4 Drawing Sheets

OPHTHALMIC LENS MOLD SEAL

BACKGROUND OF THE INVENTION

Soft ophthalmic lenses for placement on the cornea or within the eye, such as contact lenses or soft intraocular lenses, can be made by a variety of techniques. Contact lenses can be made by spin casting a prepolymer material in a rotating mold then polymerizing the material so shaped. Another method used to manufacture both contact lenses and intraocular lenses is precision lathing of a piece of material which is then polished and used as a lens.

Recently the molding of soft contact lenses and soft intraocular lenses has come into favor. This technique has the advantages of repeatability and speed that compares favorably with the prior methods of manufacturing lenses. Techniques for successfully molding such lenses can be found in U.S. Pat. Nos. 4,495,313 and 4,889,664. These patents specifically described the use of a diluent, a material which substitutes for water during the molding process, and which is replaced with water after the molding has been completed. The advantage of this technique is that the optical properties, size and shape of the lens thus made does not change as radically as with methods that do not utilize such diluent.

The molds used for forming such lenses are typically made of polystyrene and are described in U.S. Pat. Nos. 4,565,348 and 4,640,489. Although such techniques described therein are successful in making molded ophthalmic lenses, the most frequently encountered defect of such lenses is in the edge portion.

It has been theorized that many of these defects are caused by the fact that in making the lens an excess amount of prepolymer is placed in the female portion of the mold cavity and when the male portion is mated therewith, the excess prepolymer is displaced from the cavity and forms a ring about the periphery of the mated pair of mold portions.

Upon the separation of the two-mold portions, parts of the edge of the polymerized lens may still be attached to the peripheral flashing of now polymerized excess material causing edge irregularities when the two are separated.

This phenomenon is easily understood if one considers that a plane is defined by three points and that any deviation from a perfectly planar mating edge can cause a gap between the male and female portions of the mold.

Some manufacturers implement an edge lathing operation subsequent to the manufacturing of the lens in order to obtain a smooth edge. While polishing is possible with many hydrophilic materials in their dry state, this involves additional processing steps. Furthermore, some lens materials such as silicon, monomer/diluent mixtures and fluoropolymers are not compatible with being polished due to their physical properties.

It is the object therefore of the present invention, to present an ophthalmic lens mold which produces a lens free of edge defects.

This object is accomplished by providing a mold that forms a region of prepolymer discontinuity between the lens and the flashing.

The mold portions of the present invention contain on one portion a knife edge that makes line contact with the other portion and further contain a circumferential lens bushing peripherally exterior to the knife edge such that when the two portions are forced together the knife edge deformably penetrates the mold portion with which it is in contact and the rim bushing makes contact with the opposite mold portion.

DETAILED DESCRIPTION OF THE PREFERRED EMBODIMENT

Figure 1:
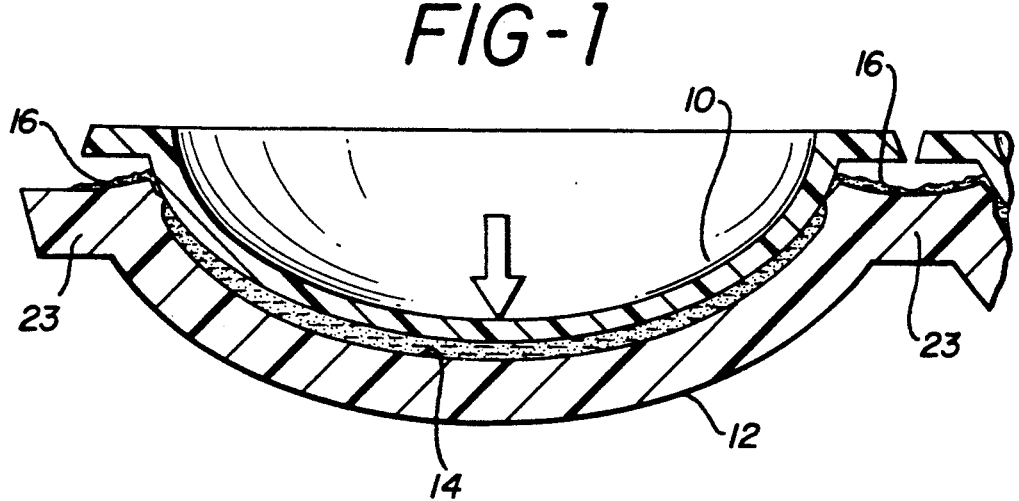
FIG. 1 shows in cross-section a pair of mated mold portions and indicates the relationship with adjoining mold pairs.

Referring to FIG. 1, there is shown a mated pair of mold portions in relation to adjoining mold portion pairs. Specifically, the male portion 10 and female portion 12 are shown which constitute a mold pair. Between the mold pair is the lens cavity 14 containing prepolymer and excess prepolymer 16 is shown circumferentially exterior to the mold cavity and lens.

Figure 2:
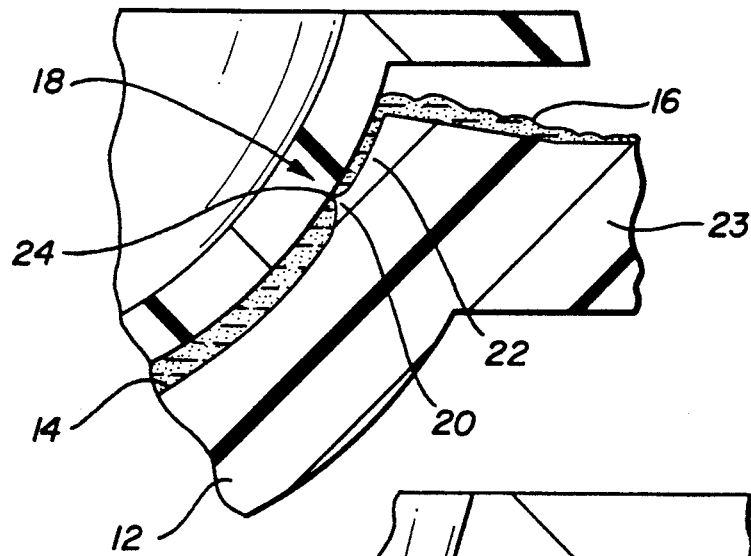
FIG. 2 shows in enlarged cross-section, the aspect of the present invention with the mold portions mated but without the deforming force applied.

The place of contact between the portions of the mold are shown at 18. This is shown in greater detail by reference to FIG. 2. When contact is first made between male portion 10 and female portion 12, contact is at knife edge 20 upon the male portion of the mold. Region 22, in this embodiment on the female portion of the mold pair, is a rim bushing which is in close proximity to the male portion 10 when contact is first made between the pair.

A specific construction of the apparatus of the present invention is as follows: the knife edge 20 extends above the adjoining rim bushing 22 between 2 and 10 microns. In cross-section, knife edge 20 has a blunted triangular shape with the extending blunt tip having a radius of between 2 and 10 microns with a preferred radius of between 2 and 6 microns.

The rim bushing 22 has a preferred width of 0.278 millimeters, and as can be seen from the drawings and appreciated by one skilled in plastic molding, the knife edge does not make a sudden transition from the rim bushing 22 or lens mold surface of the female portion 12, but rather is gradually flared to meet those surfaces. As can also be seen from the drawings the rim bushing extends beyond the plane of the female portion flange 23 by approximately 50 to 100 microns.

Figure 3:
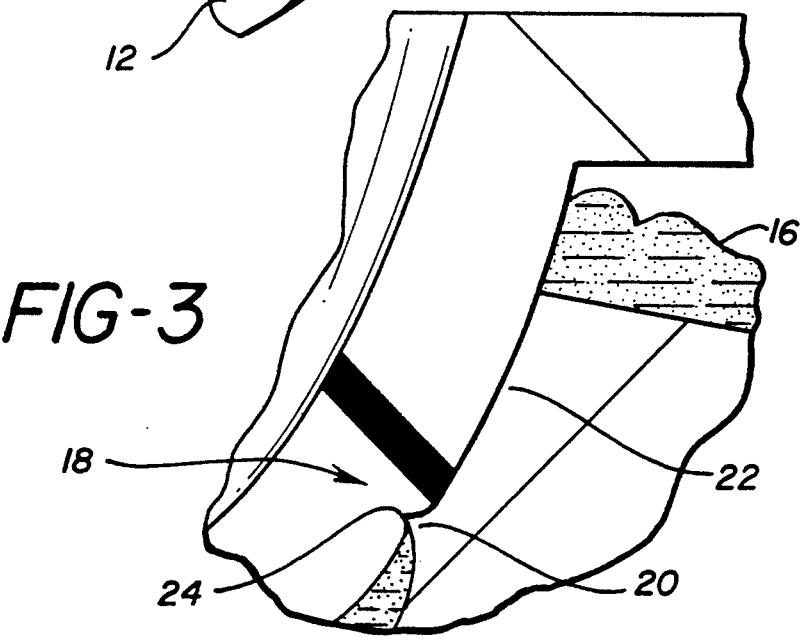
FIG. 3 shows in enlarged cross-section the aspect of the present invention with the mold pieces mated and the deforming force applied.

Turning now to FIG. 3, after force has been applied compressing the male and female portions together, the knife edge contained on the female portion deformably penetrates into the male portion 10 at location 24. This deformation causes the rim bushing region 22 on the female portion which is proximate the male portion 10 to come into contact with the male portion. In this way a region of discontinuity is formed between the lens 14 and the flashing 16.

The method of making the soft ophthalmic lens is straight forward. The female mold portion is filled with an amount of prepolymer in excess of that needed to form the lens. The male portion is then mated with the prepolymer-containing female portion with sufficient force so that when the two portions are mated the knife edge on the female portion makes line contact with the male portion around the circumference. The force is increased until sufficient to cause the knife edge to deformably penetrate the mating male portion. The excess prepolymer during this process is displaced from the cavity of the female mold portion producing a flashing about the perimeter of the mold pair cavity.

The penetration of the knife edge is to a degree that the rim bushing on the female mold portion which is peripherally exterior to the knife edge makes contact with the male portion of the mold pair and forms a region of prepolymer discontinuity between the lens and the flashing that is produced by the excess prepolymer.

Specifically in the invention, a force of between 200 grams and 5,000 grams (5 kilograms) is applied in compression to the two mold portions. In the preferred embodiment this force is between 500 grams and 2,000 grams. This force has been found to be sufficient with the above described mold portions to cause the knife edge to deformably penetrate the mating male portion and achieve a region of discontinuity between lens 14 and flashing 16.

The prepolymer is then caused to be polymerized by a chemical, thermal or ultraviolet means of polymerization initiation. After polymerization is completed, the male and female portions of the mold pair are separated and the lens is removed.

This knife edge/rim bushing arrangement has other advantages. Because the knife edge is now interior to the rim bushing, it is protected against impact damage while the molds are being handled. In addition, the region of prepolymer discontinuity formed by the rim bushing causes surface tension/vacuum adhesion between the mold pair portions with the result that the individually free male portions are less likely to move or be dislocated between the time it is mated with the female portion and polymerization is completed.

Figure 7:
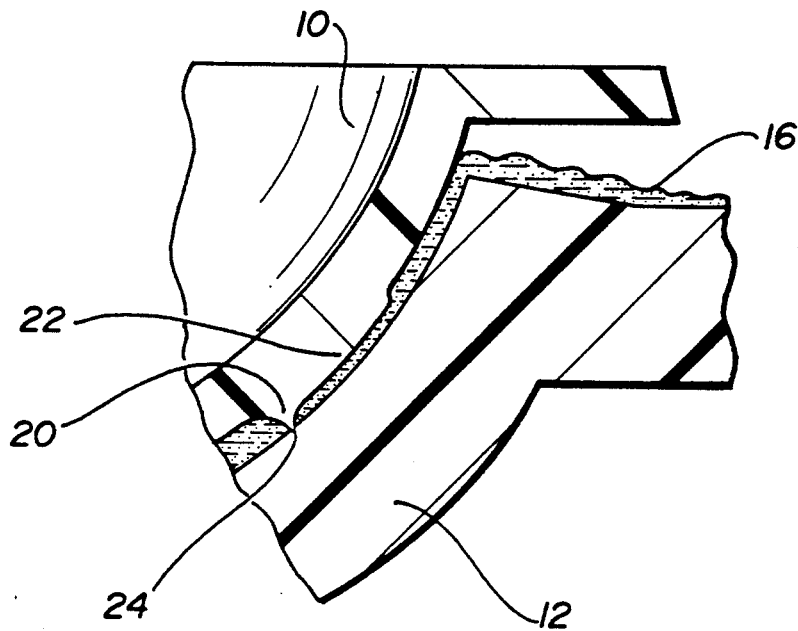
FIGS. 7-8 show enlarged cross sections of alternative embodiments of the present invention.
Figure 8:
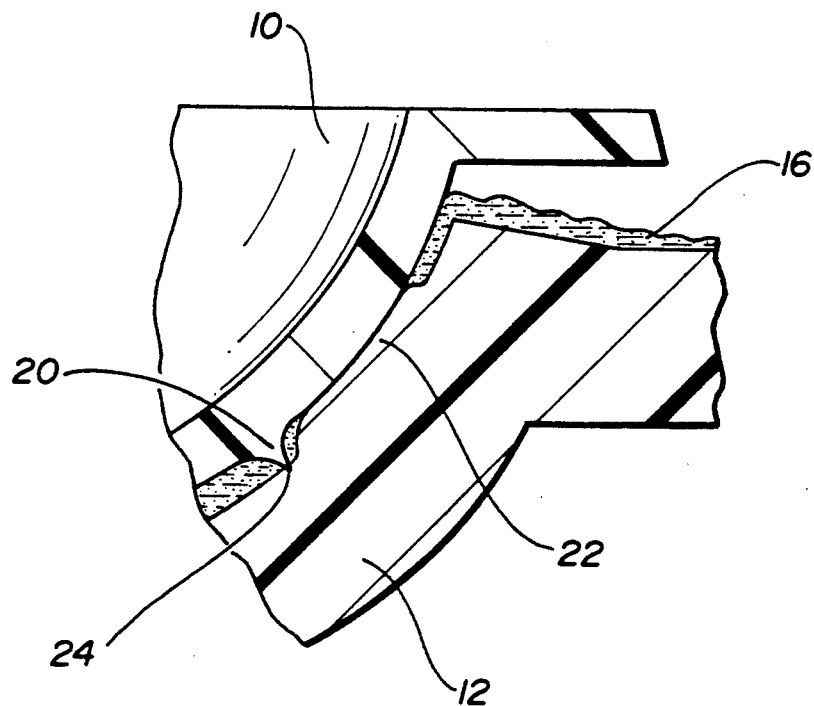

It should be clear that within the scope of the present invention that the knife edge or the rim bushing may be placed on the male portion of the mold pair, as shown in FIG. 7. Further, it is clear that the knife edge and rim bushing need not necessarily be on the same portion of the mold pair, as shown in FIG. 8. In short, the knife edge and rim bushing may be either on the female or male portion of the mold pair either together or one on each mold portion.

The advantage of the invention is clearly demonstrated when compared with the prior art method of using the knife edge alone. There is also unexpected and surprising synergy shown when the knife edge is used with the rim bushing to produce a yield of good lenses which is markedly superior to the use of a bushing type seal alone.

For example, when using the prior art knife edge mold mating technique alone, the percentage of acceptable lenses ranged between 61 and 79 percent. When the rim bushing was used alone without the knife edge, the yield of acceptable lenses was between 59 and 70 percent. When the present invention employing the knife edge with a peripheral rim bushing was utilized, the yield ranged between and 83 and 88 percent.

This may be attributed in part to the rim bushing reducing the rocking motion of the male portion of the mold pair relative to the female portion when the mold portions are separated after lens polymerization and thereby reducing the incidence of lens edge tearing.

Figure 4:
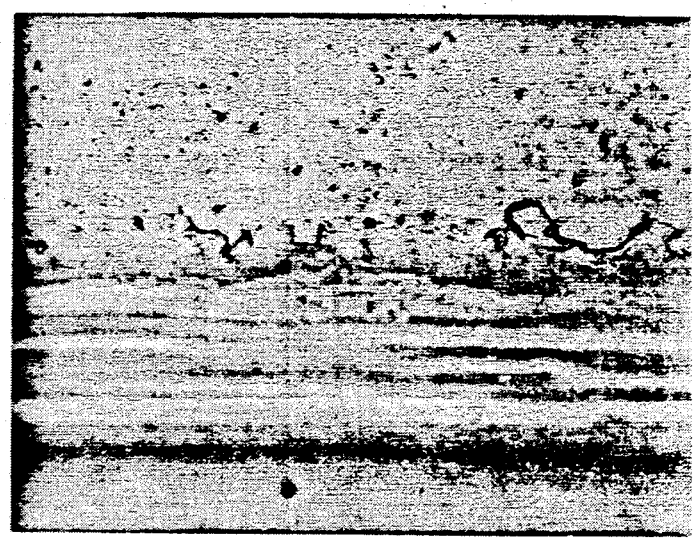
FIG. 4 is a photomicrograph showing at 250 magnification a lens edge typical of those made with the prior art knife edge only.
Figure 5:
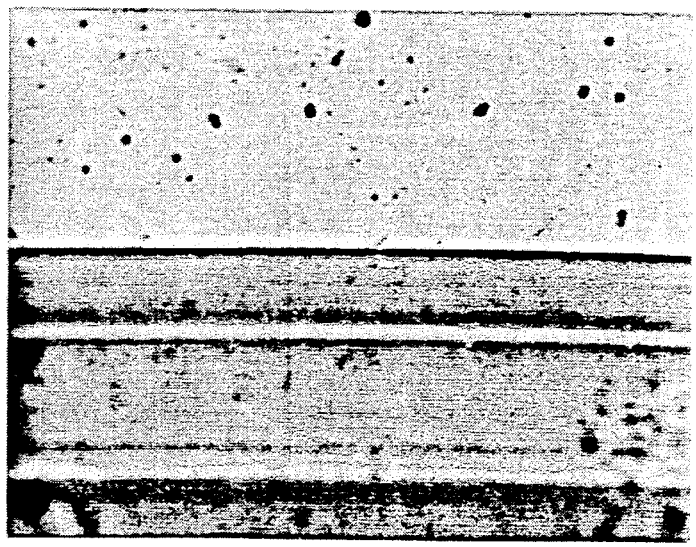
FIG. 5 is a photomicrograph showing at 250 magnification a lens edge typical of those made with the knife edge in combination with the rim bushing.

In addition to providing significant yield improvements, the present inventions also produces a lens edge that is much smoother in comparison with the serrated lens edge typically produced by a mold using the knife edge only. The comparison can be seen by reference to FIGS. 4 and 5 comparing lens edges typical of those made with knife edges only and the knife edge in combination with the rim bushing. These photographs show the lens edge at 250 power magnification.

Figure 6:
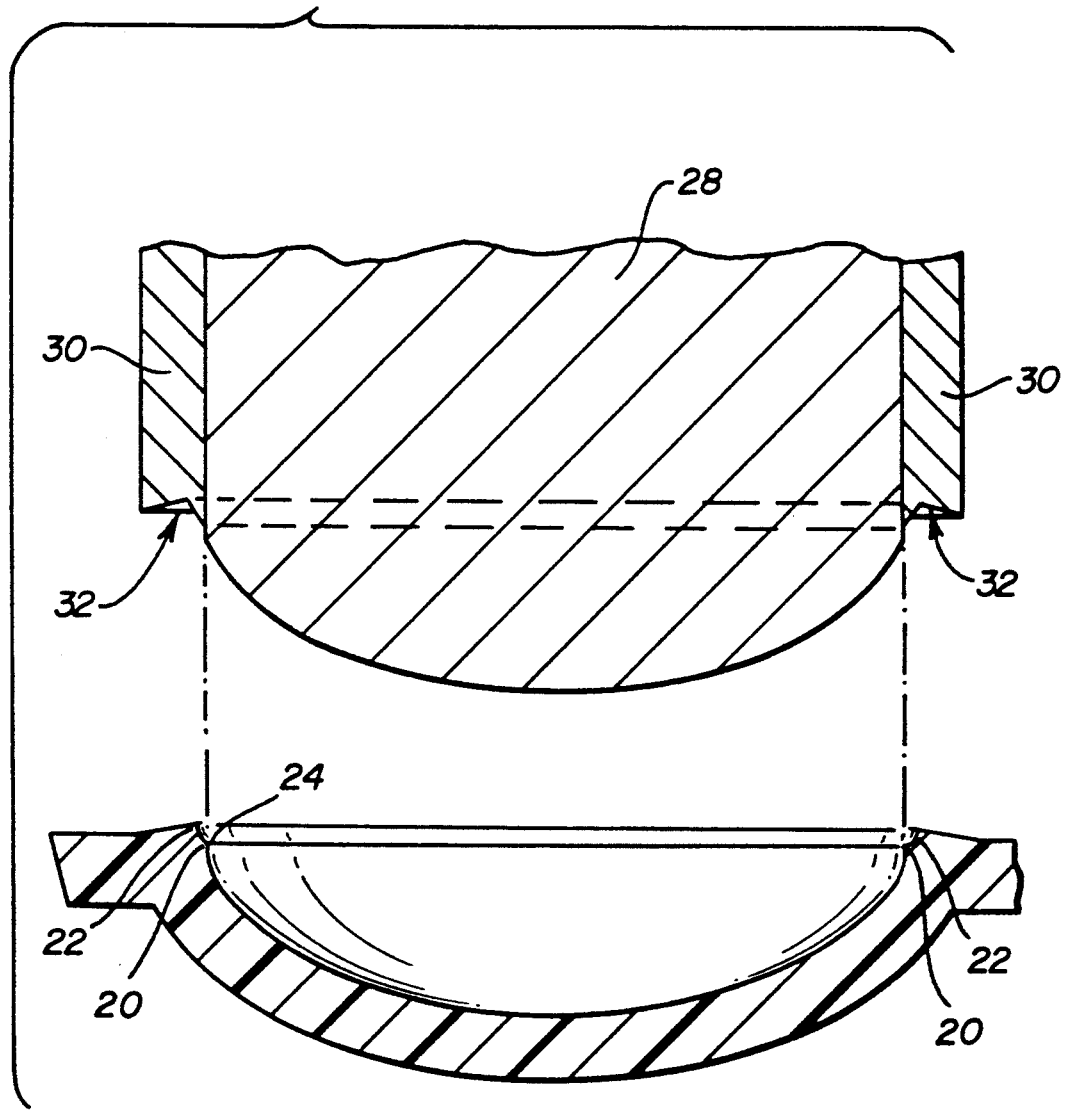
FIG. 6 shows in cross-section the apparatus for making the mold of the present invention.

Referring now to FIG. 6, there is shown an apparatus used in the preferred method for producing a female mold portion having the knife edge and rim bushing of the present invention.

Consistent with the prior figures, female mold portion 12 is shown having knife edge 20 and rim bushing 22.

This mold part for producing a soft ophthalmic lens is likewise molded, but made from polystyrene material. The concave side of the female portion which contains the optical surface 26 is molded by use of a two-piece mold on that side. The non-optical surface is molded using traditional apparatus.

The part for molding this optical surface side of the mold portion is produced by machining a cylindrical insert 28 for forming the optical surface 26 of the female portion 12 with a convex surface which is the reverse image of the mold surface 26.

An annular sleeve 30 is then machined to have an inner diameter approximately equal to the outer diameter of the cylindrical insert 28 and further to have an annular edge 32 on the sleeve having the reverse image of the rim bushing.

The insert 28 is then located within the annular sleeve 30 such that the surfaces of the insert and annular sleeve are axially aligned to form the desired optical surface/rim bushing arrangement. The female mold portion is then formed about the surface of the combination of the aligned insert 28 and annular sleeve 30.

Once again, it should be clear that the above described technique for producing a mold portion using insert 28 and annular sleeve 30 is equally applicable to the male mold portion should that design approach be taken.

I claim:

1. A mold for molding a soft ophthalmic lens for placement on the cornea or within the eye comprising:
   a female portion having a concave surface;
   a male portion having a convex surface;
   one of said portions containing about the periphery of said surface on said one portion a knife edge, such that the two portions are deformably mated by said knife edge penetrating the other of said portions about the circumference of said surface on said other portion, forming a cavity between said concave and convex surfaces that defines said ophthalmic lens; and
   a circumferential rim bushing peripherally exterior to said knife edge, said rim bushing forming a region on one of said portions and making contact with the other of said portions after the mold portions are deformably mated.

2. The mold of claim 1 wherein said knife edge is located on said female portion.

3. The mold of claim 1 wherein said knife edge is located on said male portion.

4. The mold of claim 1 wherein the portion containing said knife edge further contains said rim bushing.

* * * * *